United States Patent
Chen

(10) Patent No.: US 9,862,143 B2
(45) Date of Patent: Jan. 9, 2018

(54) ONE-PIECE PULL TAB

(71) Applicant: Duraflex Hong Kong Limited, Sheung Wan (HK)

(72) Inventor: Te Chien Chen, Tsuen Wan (HK)

(73) Assignee: Duraflex Hong Kong Limited, Sheung Wan (HK)

(*) Notice: Subject to any disclaimer, the term of this patent is extended or adjusted under 35 U.S.C. 154(b) by 165 days.

(21) Appl. No.: 14/969,094

(22) Filed: Dec. 15, 2015

(65) Prior Publication Data

US 2017/0164697 A1  Jun. 15, 2017

(51) Int. Cl.
| | |
|---|---|
| *A44B 19/42* | (2006.01) |
| *A44B 19/26* | (2006.01) |
| *B29C 45/14* | (2006.01) |
| *B29C 69/00* | (2006.01) |
| *B29C 65/56* | (2006.01) |
| *B29L 31/00* | (2006.01) |
| *B29L 5/00* | (2006.01) |

(52) U.S. Cl.
CPC .......... *B29C 65/56* (2013.01); *A44B 19/262* (2013.01); *B29C 45/14819* (2013.01); *B29C 69/001* (2013.01); *B29L 2005/00* (2013.01); *B29L 2031/727* (2013.01)

(58) Field of Classification Search
CPC . B29C 65/56; B29C 69/001; B29C 45/14819; B29L 2005/00; B29L 2031/727; A44B 19/262; Y10T 24/3918
See application file for complete search history.

(56) References Cited

U.S. PATENT DOCUMENTS

| | | | |
|---|---|---|---|
| 3,146,012 A * | 8/1964 | King, Sr. .............. | G09F 3/0358 24/16 PB |
| 3,290,080 A | 12/1966 | Dawson | |
| 3,712,655 A * | 1/1973 | Fuehrer ................ | F16B 21/071 24/16 PB |
| 3,831,474 A | 8/1974 | Perlman | |
| 3,975,040 A | 8/1976 | Van Gompel | |
| 4,093,288 A | 6/1978 | Suzuki | |

(Continued)

FOREIGN PATENT DOCUMENTS

WO     2011/139546 A1    11/2011

OTHER PUBLICATIONS

International Search Report and Written Opinion of the International Searching Authority of PCT/CN2015/083014, dated Oct. 13, 2015.

*Primary Examiner* — Robert Sandy
*Assistant Examiner* — Louis A Mercado
(74) *Attorney, Agent, or Firm* — Collard & Roe, P.C.

(57) ABSTRACT

A pull tab for zippers is formed by a cord having a cord retaining member attached to one end of the cord and a plug attached to other end of the cord. The cord retaining member has an internal cavity, a first aperture on a proximal end next to the cord and a second aperture on a distal end. The cavity and first and second apertures are sized so that when the cord is wrapped around the plug, the plug fits through the second aperture and cavity but does not fit through the first aperture. The pull tab is assembled by feeding the plug through a zipper tab and then the first aperture, the cavity and the second aperture, wrapping the cord around the plug, and pulling the cord to force the plug with the cord wrapping back into the cavity.

7 Claims, 3 Drawing Sheets

(56) References Cited

U.S. PATENT DOCUMENTS

| | | | |
|---|---|---|---|
| 4,106,802 A * | 8/1978 | Lozio | G09F 3/0311 |
| | | | 292/320 |
| 4,240,183 A * | 12/1980 | Sumimoto | F16B 21/088 |
| | | | 24/16 PB |
| 4,245,374 A * | 1/1981 | Suzuki | G09F 3/037 |
| | | | 24/16 PB |
| 4,299,417 A | 11/1981 | McClure | |
| 4,532,679 A * | 8/1985 | Scott | B65D 63/1081 |
| | | | 24/16 PB |
| 4,580,319 A * | 4/1986 | Paradis | B29C 45/0055 |
| | | | 24/16 PB |
| 4,609,218 A * | 9/1986 | Chevillard | B65D 63/1081 |
| | | | 24/16 PB |
| 4,636,347 A | 1/1987 | Kato | |
| 5,347,692 A | 9/1994 | Ebata | |
| 5,416,951 A | 5/1995 | Keyaki et al. | |
| 5,535,491 A | 7/1996 | Allport | |
| 5,632,076 A | 5/1997 | Ervin et al. | |
| 5,860,192 A | 1/1999 | Chung | |
| 6,058,578 A * | 5/2000 | Lan | A44B 19/262 |
| | | | 24/115 G |
| 6,073,319 A * | 6/2000 | Silagy | A43C 1/02 |
| | | | 24/712.1 |
| 6,098,253 A | 8/2000 | Nishida et al. | |
| 6,321,434 B1 | 11/2001 | Kubota | |
| 6,415,482 B1 | 7/2002 | Pontaoe | |
| 6,440,339 B1 | 8/2002 | Magidson et al. | |
| 6,560,829 B1 | 5/2003 | Chen | |
| 7,043,802 B2 * | 5/2006 | Moeller | A44B 19/262 |
| | | | 24/429 |
| 7,047,602 B2 * | 5/2006 | Wang | A44B 19/262 |
| | | | 24/429 |
| 7,264,287 B2 | 9/2007 | Ching | |
| 7,360,806 B2 | 4/2008 | Ching | |
| 7,472,933 B2 | 1/2009 | Weedon et al. | |
| 8,910,351 B2 | 12/2014 | Iannello et al. | |
| 2004/0148745 A1 | 8/2004 | Moeller et al. | |
| 2005/0022347 A1 * | 2/2005 | Yang | A44B 19/262 |
| | | | 24/429 |
| 2005/0097712 A1 | 5/2005 | Raynor | |
| 2007/0124901 A1 | 6/2007 | Cyr et al. | |
| 2009/0265899 A1 | 10/2009 | Yang | |
| 2013/0104348 A1 | 5/2013 | Wang | |
| 2016/0007692 A1 | 1/2016 | Chen | |
| 2016/0108989 A1 * | 4/2016 | Symons | A43C 7/06 |
| | | | 24/136 R |
| 2017/0164697 A1 | 6/2017 | Chen | |

\* cited by examiner

ONE-PIECE PULL TAB

BACKGROUND OF THE INVENTION

1. Field of the Invention

The present invention relates to a one-piece pull tab for zippers. In particular, the invention relates to a pull tab that can be applied directly to the zipper head and which is molded in one piece.

2. The Prior Art

Pull tabs for zippers are usually formed by metal plates having an aperture in which the zipper head is mounted. These metal plates are often too small to allow for easy sliding of the zipper. This is especially true when the zipper pull becomes wet and slippery. Therefore, many manufacturers attach a cord having a larger pull on the end to the existing zipper pull. However, these additional cords are often too long to make pulling easy, and the manufacturing process is expensive and time consuming.

SUMMARY OF THE INVENTION

It is therefore an object of the invention to provide a zipper pull that can be applied directly to the zipper head, can be customized for a variety of sizes and decorations, and which can be produced simply and economically in a single piece.

These and other objects of the invention are accomplished by a pull tab formed by a cord having a cord retaining member attached to one end of the cord and a cavity in the interior of the cord retaining member, and a securing device formed by a plug attached to other end of the cord. The cavity is sized to be larger in both height and width than the cord. The cord extends from a first end of the cord retaining member. Adjacent the cord is a first aperture in the cord retaining member that connects to the interior cavity. The aperture is sized to allow the plug to pass completely through. On the opposite side of the cord retaining member is a second aperture that also connects to the cavity. The second aperture is larger than the circumference of the plug, and has a height that is greater than its width. In order to secure the device to a zipper, the plug is fed through the loop on the zipper and then through the first and second apertures in the cord retaining member, so that the plug extends entirely through the opposite end of the cord retaining member. At this point, the cord is wrapped longitudinally around the plug at least once. Finally, the plug with the cord wrapping is pulled into the cavity through the second aperture by pulling on the looped cord on the proximal end of the cord retaining member. The cord wrapping is positioned vertically so that the cord is above and below the plug when inserted through the second aperture. The cavity is sized to be the same size or just slightly smaller than the circumference of the plug with the cord wrapped around it. This way, the plug can be pulled back into the cord retaining member and held in the cavity via friction fit. The plug with the cord wrapping is much too large to fit through the first aperture, so the plug cannot be inadvertently disengaged from the cord retaining member.

The plug can have a circumferential groove around its perimeter so that the cord is seated in the groove when it is wrapped around the plug. This keeps the cord from slipping out of alignment during assembly. The plug can also have a grooved or textured surface on the faces that are exposed after the cord is wrapped around it. This grooved or textured surface increases the friction created by the plug against the cavity walls, to keep the plug inside the cavity.

The cavity can have shoulders that separate the cavity from the first opening. These shoulders can be shaped so as to form an acute angle with the sidewalls of the cavity. This acute angle creates a point that can embed in the cord after the plug has been inserted in the cavity and thus further secure the plug within the cavity.

The cord can be a woven cord, and the cord retaining member and plug are then over-molded onto the woven cord.

The cord retaining member can be formed in several shapes.

The pull tab of the present invention can be applied directly to a zipper head without the need for a traditional zipper pull. This reduces cost and labor in manufacturing consumer items. The cord could be made to any desired length, depending on the needs of the end user.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
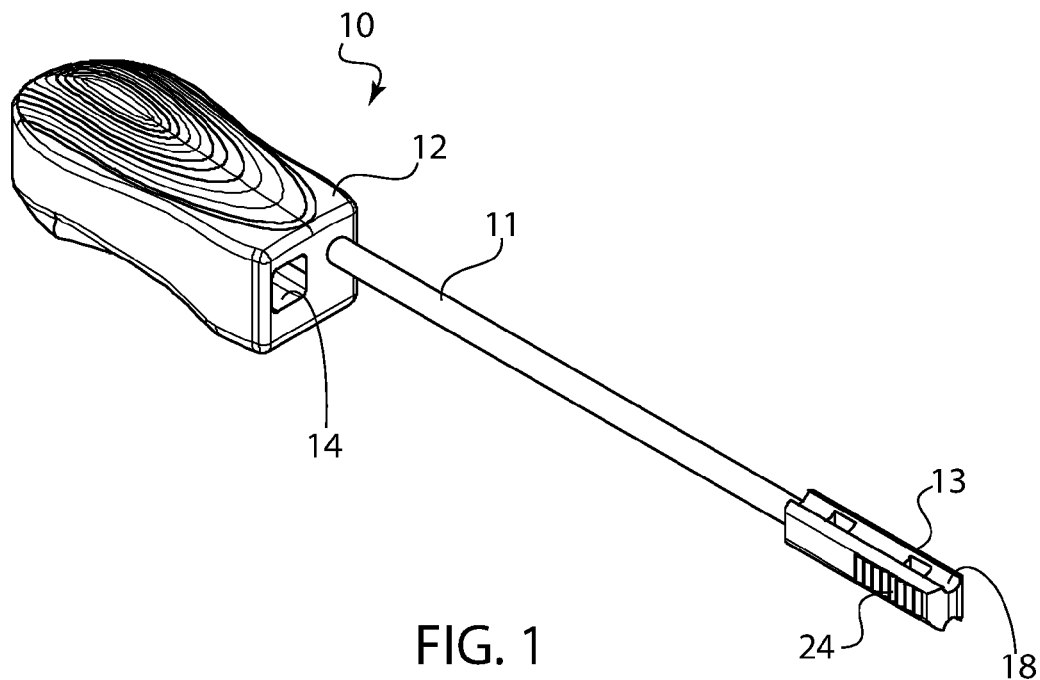
FIG. 1 shows a perspective view of a first embodiment of a pull tab according to the invention, in an unfolded configuration.
Figure 2:
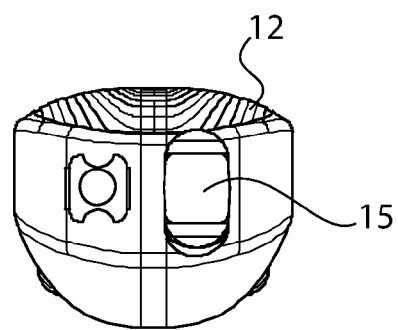
FIG. 2 shows an end view of the cord retaining member of the pull tab.

Referring now in detail to the drawings and, FIGS. 1 and 2 show a pull tab 10 according to the invention. Pull tab 10 is comprised of a cord 11 having a cord retaining member 12 at one end and a plug 13 at the other end. Cord retaining member 12 and plug 13 are both over molded onto cord 11, which can be a woven cord made of any suitable material. Cord retaining member 12 has a first aperture 14 therein, for receiving plug 13 when cord 11 is folded over itself. As shown in FIG. 2, second aperture 15 is disposed on the opposite end of plug retaining member 12. Between first and second apertures 14, 15 is an interior cavity 16, shown in FIG. 3.

Figure 3:
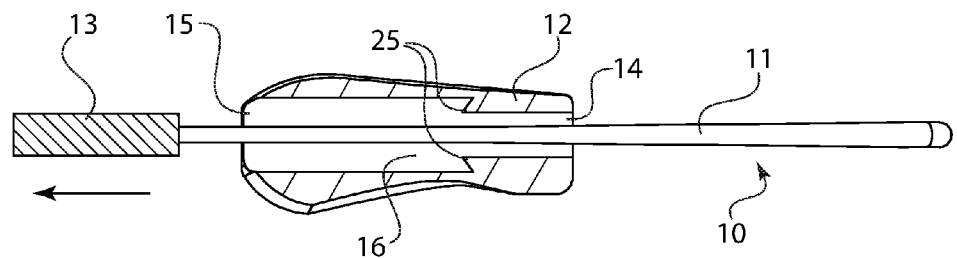
FIG. 3 is a side-cross-sectional view of the pull tab, with the plug put through both of the first and second apertures of the cord retaining member.
Figure 4:
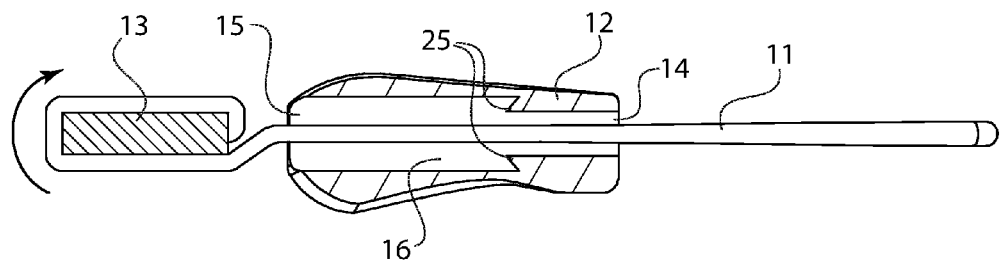
FIG. 4 shows the pull tab of FIG. 3 with the cord wrapped around the plug.
Figure 5:
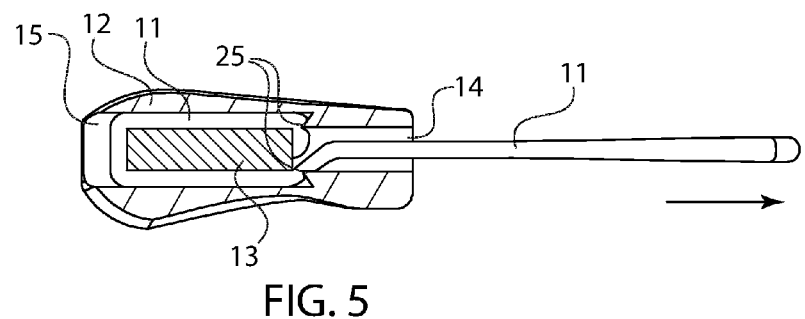
FIG. 5 shows the pull tab of FIG. 3 with the plug pulled back inside the cord retaining member.
Figure 6:
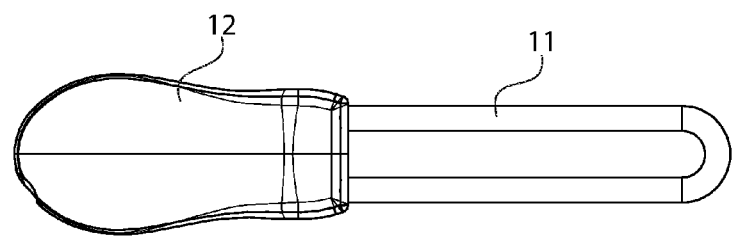
FIG. 6 shows a top view of the pull tab of FIG. 5.

To attach pull tab 10 to a zipper head (not shown), plug 13 is first threaded through the zipper head and then through first aperture 14, through cavity 16 and out second aperture 15, as shown in FIG. 3. Cord 11 is thus folded over itself forming a loop. As shown in FIG. 4, cord 11 is then wrapped around the length of plug 13 so that cord 11 surrounds plug 13. Then, as shown in FIG. 5, cord 11 is pulled backward, forcing plug 13 with the cord wrapped around it back into cavity 16. First aperture 14 has a height and width that is smaller than the height and width of plug 13 with the cord wrapped around it, so that plug 13 cannot be pulled back through aperture 14. This keeps plug 13 securely within cavity 16. In addition, cavity 16 can be made to be just slightly smaller than the circumference of plug 13 with the cord wrapped around it, so that cavity 16 exerts enough frictional force on plug 13 and cord 11 to keep plug 13 and cord 11 securely within cavity 16 at all times without any movement.

To keep cord 11 wrapped around plug 13 in a secure, non-sliding manner, plug 13 can be made with a groove 18 surrounding it on all sides as shown in FIG. 1. Cord 11 can be wrapped around plug 13 so that cord 11 rests in the groove 18 and cannot slide out of alignment from plug 13. Plug 13 can also have a grooved or textured surface 24 on the faces that are exposed after the cord is wrapped around it. This surface 24 creates extra friction on the sidewalls of cavity 16 after plug 13 is inserted into the cavity 16, to keep plug 13 securely within cavity 16.

Cavity 13 has two shoulders 25 that separate cavity 16 from first aperture 14. Shoulders 25 are formed so that they create an acute angle with the longitudinal sidewalls of cavity 16 and thus form points that face the distal end of cord retaining member 12. As shown in FIG. 5, these points of shoulders 25 dig into cord 11 in the assembled state, to further keep plug 13 securely lodged inside cavity 16.

Figure 7:
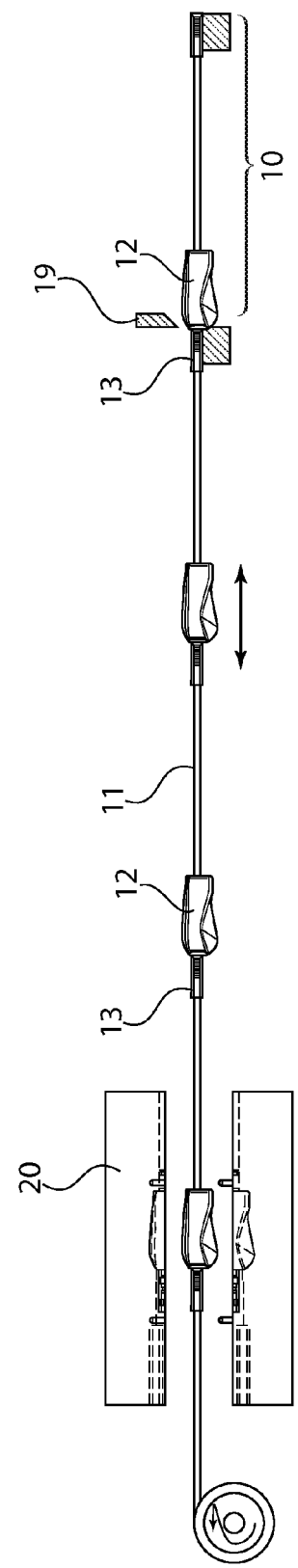
FIG. 7 shows the molding and cutting process for forming a pull tab according to the invention.

To manufacture pull tab 10 according to the invention, the cord retaining members 12 and plugs 13 are continuously over-molded onto cord 11 using a mold 20, shown in FIG. 7. In the production process shown in FIG. 7, cord retaining members 12 and plugs 13 are molded in one piece onto cord 11. Then, the cord retaining member 12 is separated from the attached plugs 13 by cutting them apart with a cutter 19, thus separating each pull tab 10 from the continuous line.

Accordingly, while only a single embodiment of the present invention has been shown and described, it is obvious that many changes and modifications may be made thereunto without departing from the spirit and scope of the invention.

What is claimed is:

1. A pull tab comprising:
   a cord having a first end and a second end;
   a cord retaining member having a proximal end attached to the first end of the cord, a distal end, a top surface, a bottom surface, a first aperture disposed on the proximal end of the cord retaining member, a second aperture disposed on the distal end, and an interior cavity extending through the cord retaining member between the first and second apertures; and
   a plug attached to the second end of the cord, the plug being sized so that it fits through the first and second apertures and the cavity,
   wherein the cavity and first and second apertures are sized so that when the cord is wrapped around the plug, the plug fits through the second aperture and cavity but does not fit through the first aperture, and
   wherein the pull tab is assembled by feeding the plug through the first aperture, the cavity and the second aperture, wrapping the cord around the plug, and pulling the plug into the cavity.

2. The pull tab according to claim 1, wherein the cord is a woven cord and the cord retaining member and securing device are molded onto the woven cord.

3. The pull tab according to claim 1, wherein the plug has a groove extending around a circumference of the plug, and wherein the cord fits in the groove when wrapped around the plug.

4. The pull tab according to claim 1, wherein the plug has a grooved or textured surface on at least one side.

5. The pull tab according to claim 1 wherein the cord retaining member has shoulders formed between the cavity and the first aperture, said shoulders forming an acute angle with a longitudinal sidewall of the cavity and creating points that embed into the cord when the plug is inserted into the cavity.

6. A method for assembling a pull tab, the pull tab comprising a cord having a first end and a second end, a cord retaining member having a proximal end attached to the first end of the cord, a distal end, a top surface, a bottom surface, a first aperture disposed on the proximal end of the cord retaining member, a second aperture disposed on the distal end, and an interior cavity extending through the cord retaining member between the first and second apertures, and a plug attached to the second end of the cord, the plug being sized so that it fits through the first and second apertures and the cavity, wherein the cavity and first and second apertures are sized so that when the cord is wrapped around the plug, the plug fits through the second aperture and cavity but does not fit through the first aperture, the method comprising the following steps:
   feeding the plug through the first aperture, the cavity and the second aperture so that the plug extends through the distal end of the cord retaining member,
   wrapping the cord around the plug; and
   pulling the cord back through the first aperture until the plug is seated within the cavity.

7. The method according to claim 6, wherein the plug has a groove extending around a circumference thereof, and wherein the step of wrapping comprises wrapping the cord around the groove in the plug.

* * * * *